United States Patent [19]
Combs et al.

[11] Patent Number: 5,905,900
[45] Date of Patent: May 18, 1999

[54] MOBILE CLIENT COMPUTER AND POWER MANAGEMENT ARCHITECTURE

[75] Inventors: James L. Combs, Lexington, Ky.; Jeffrey A. Craig, Chapel Hill; Brent Alan Miller, Cary, both of N.C.

[73] Assignee: International Business Machines Corporation, Armonk, N.Y.

[21] Appl. No.: 08/848,365

[22] Filed: Apr. 30, 1997

[51] Int. Cl.[6] .................................................. G06F 1/00
[52] U.S. Cl. ............................ 395/750.03; 395/750.05
[58] Field of Search ........................ 395/750.01–750.08

[56] References Cited

U.S. PATENT DOCUMENTS

| | | | |
|---|---|---|---|
| 5,230,074 | 7/1993 | Canova, Jr. et al. .................... | 395/750 |
| 5,428,790 | 6/1995 | Harper et al. ........................... | 395/750 |
| 5,511,205 | 4/1996 | Kannan et al. ......................... | 395/750 |
| 5,548,763 | 8/1996 | Combs et al. .......................... | 395/750 |
| 5,560,024 | 9/1996 | Harper et al. ........................... | 395/750 |
| 5,655,126 | 8/1997 | Glenning ........................... | 395/750.06 |
| 5,680,334 | 10/1997 | Silva et al. ............................... | 364/707 |

*Primary Examiner*—Ayaz R. Sheikh
*Assistant Examiner*—Jigar Pancholi
*Attorney, Agent, or Firm*—Daniel E. McConnell

[57] ABSTRACT

A computer system, and particularly a handheld mobile client system, in which an energy management control program having a plurality of cooperating components permits a designer to choose from among a plurality of foci for energy management.

15 Claims, 16 Drawing Sheets

FIG. 10

Candida Form

Main | Back

Candida Bloodstream Infections Multicenter Study

Center 12
Date of birth 04-29-54
Date of admission 04-29-54
Primary ICd9

Hospital number 123456789
Male ○ Female ○
Date admission ICU 04-29-54
Secondary ICd9

Record 1 of 6

Date of surgery
Minutes
ASA score

Type  Access Procedure
Anesthesia
Class  Clean-contaminated
Urgency

MOBILE CLIENT COMPUTER AND POWER MANAGEMENT ARCHITECTURE

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

As will be understood, the environments of use of mobile client systems typically require that such systems be powered by batteries. Long service life per battery charge is dependent upon demands made on the batteries for power. Thus designing for reduced power demand is significant in the development of such systems. While power management may be of particular interest in such a hardware context, it has a wider significance and is important to other types of computer systems including desktop systems of conventional and so-called "network computer" types.

SUMMARY OF THE INVENTION

With the foregoing as background, the present invention contemplates a mobile client system in which provision is made for management of power demand.

In realizing this purpose of the present invention, flexibility in enhanced by dividing a power management architecture into a plurality of components or areas, and then providing for particular interaction among the components, all as more particularly described hereinafter.

BRIEF DESCRIPTION OF THE DRAWINGS

Some of the purposes of the invention having been stated, others will appear as the following description proceeds, when taken in connection with the accompanying drawings, in which:

FIG. 10 is an illustration of the display screen of the mobile client of FIG. 2 while driven by the execution of an application program on the mobile client to display certain data;

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention relates to power management. As here used, the phrase "power management" refers to a set of hardware, firmware, and system software facilities employed in the efficient utilization of electrical power while continuing to meet the computational needs of the user. Although the initial impetus for power management was the extension of useful operational time for battery-powered portable computing, the scope of power manage-ment has been broadened to include energy conservation in non-portable personal computers and servers. Power management facilities can also be utilized to perform certain network resource management functions such as remote shutdown/power-off and reboot power-on.

Figure 1:
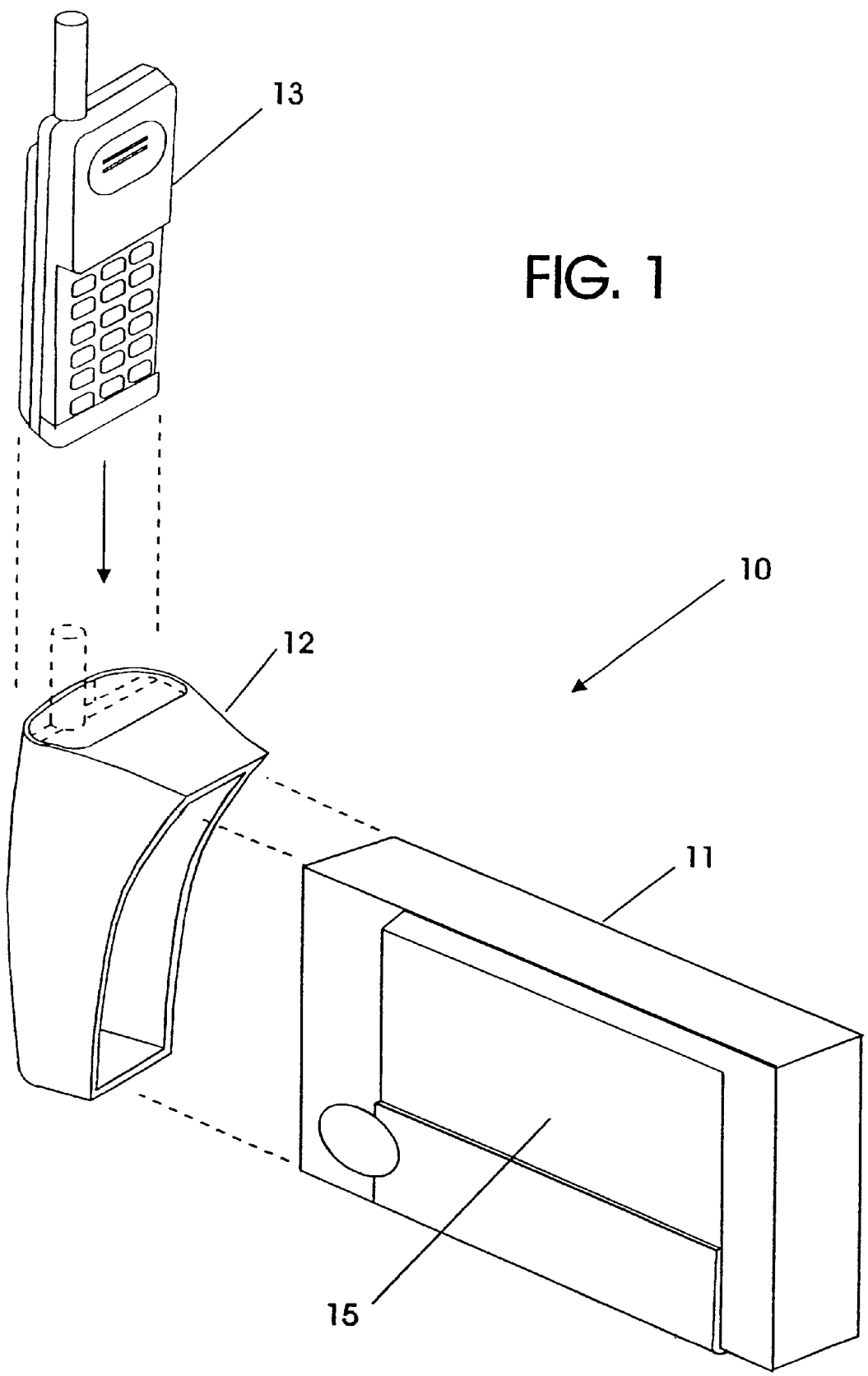
FIG. 1 is an exploded perspective view of certain elements of a mobile client computer system in accordance with this invention.
Figure 2:
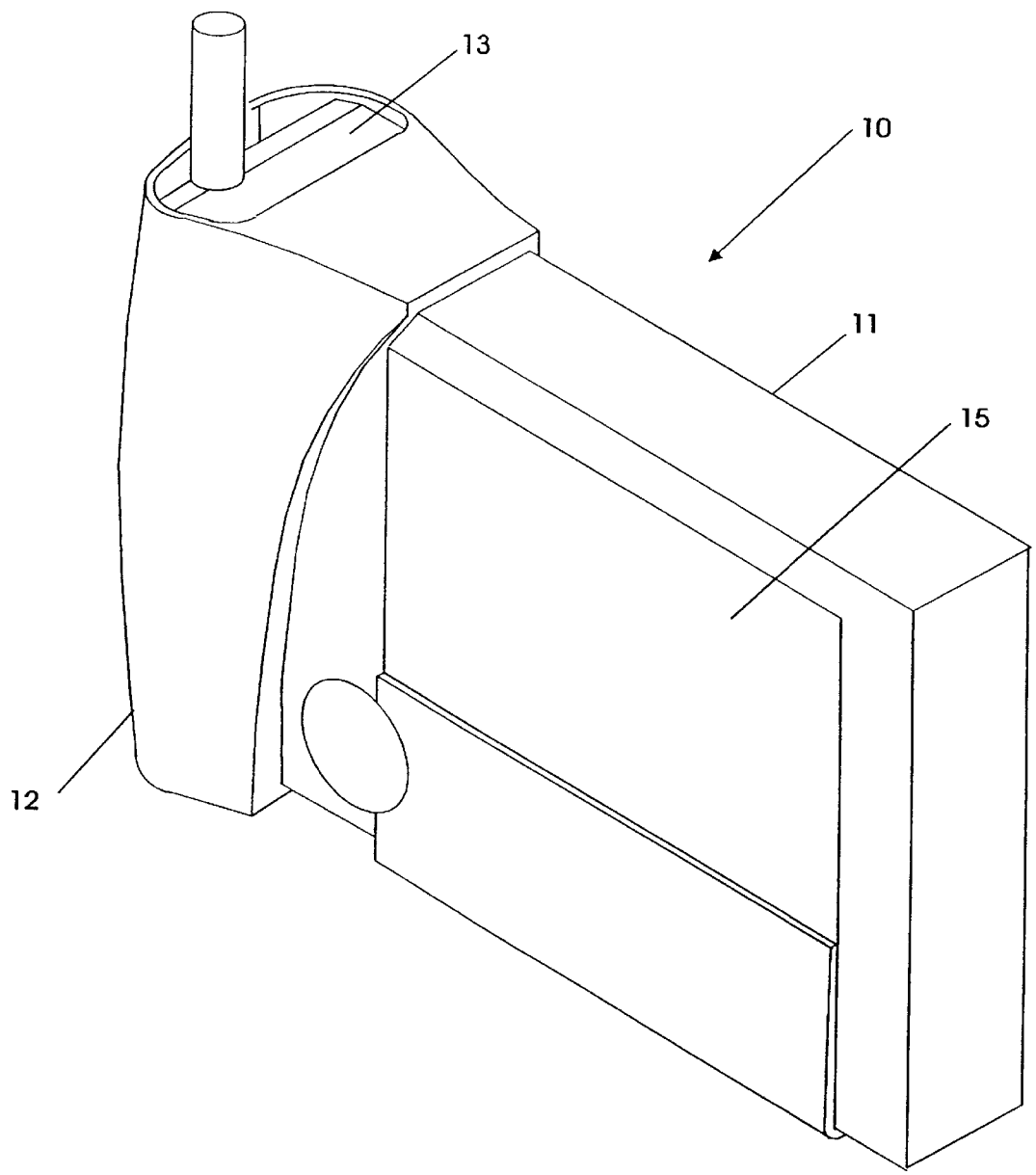
FIG. 2 is a perspective view of the mobile client system of FIG. 1 as assembled for use.
Figure 3:
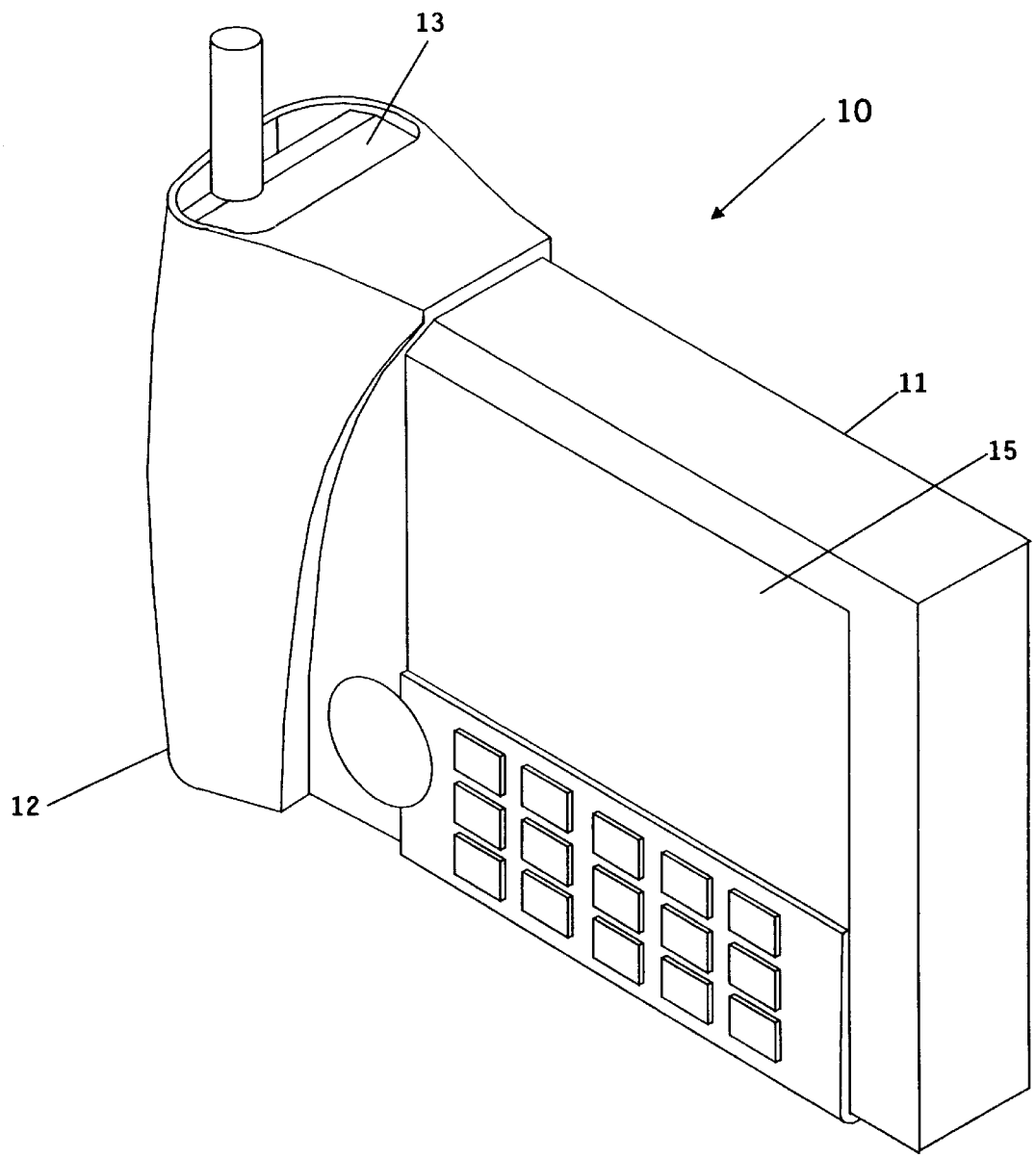
FIG. 3 is a view similar to FIG. 2 showing an alternate form of organization for the mobile client system of FIGS. 1 and 2.

The fundamental principle of reducing average power consumption is quite simple—turn off any device which is not currently in use. This policy is very straight-forward to implement, but ignores the reality that any device which is currently unused may be required at any instant in the future. If it is required immediately after it was turned off, both the time required to turn the device off and the time required to restore it to its power-on state are wasted. This delay will impact the responsiveness of the system. The key to power management which is unobtrusive is the anticipation of the future device utilization requirements of the user Referring now more particularly to the accompanying Figures, FIGS. 1 through 3 illustrate an exemplary embodiment of a mobile client personal computer system (herein also called a "mobile client") in accordance with this invention and indicated generally at 10. The mobile client computer system 10 will be used to establish a context for disclosure of the present invention, which must be noted at the outset of the discussion which follows as having far wider applicability. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. The system tablet may optionally have an integrated keypad. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

The distinctions between the systems of FIGS. 2 and 3 lies in the direct inclusion, in the system of FIG. 3, of a keypad apart from a touchscreen implementation of entry fields. This illustrates the flexibility of providing for both types of user input.

An advantage realizable with the tripartite organization is the ready substitution of one radio transceiver for another in order to accommodate various wide area networks (WANs) or local area networks (LANs). More particularly and as examples of WAN technology, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 4:
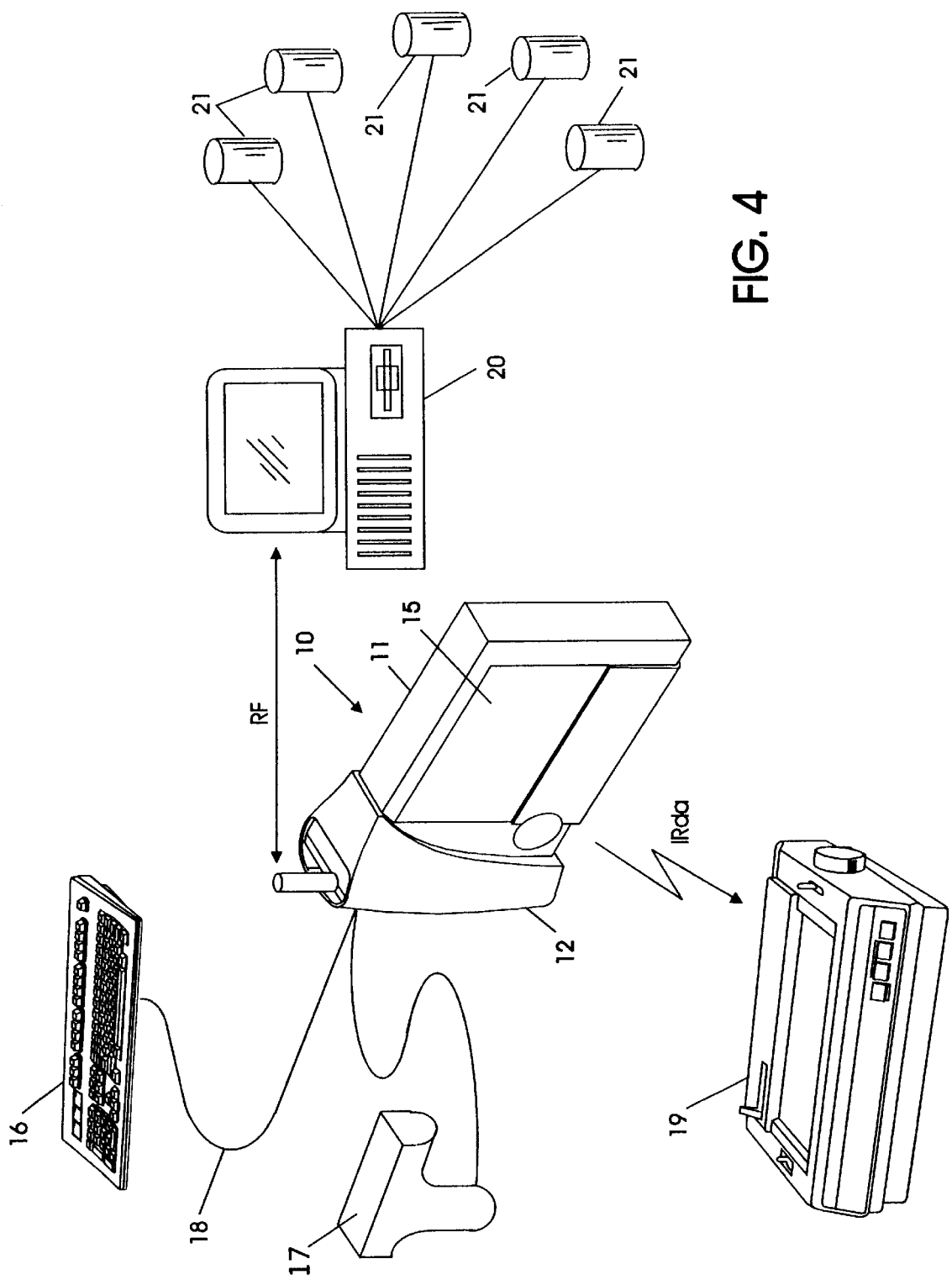
FIG. 4 is a diagrammatic representation of relationships among a mobile client system as shown in FIGS. 1 through 3 and supporting peripherals and systems.

Turning now to FIG. 4, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate other user input devices including a more conventional keyboard 16 and a bar code scanner 17. The user input device may be, as illustrated, wire tethered to the system 10 when desired for use, with the tethering conductors 18 providing signal pathways for data input to reach the system 10. As will be expanded upon hereinafter, the present subject invention is particularly concerned with an interface for such a user input device. Alternatively, a keyboard or other device such as the scanner may be linked for data transfer by other means known to persons of skill in the art, such as by direct integration as described above or an infrared link using a known protocol. By way of example and as illustrated in the drawing, the system is shown linked to a printer 19 by an IrDA link for data transfer by infrared radiation. While this is exemplary of an output device, similar technology is useful for linking an input device.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 5:
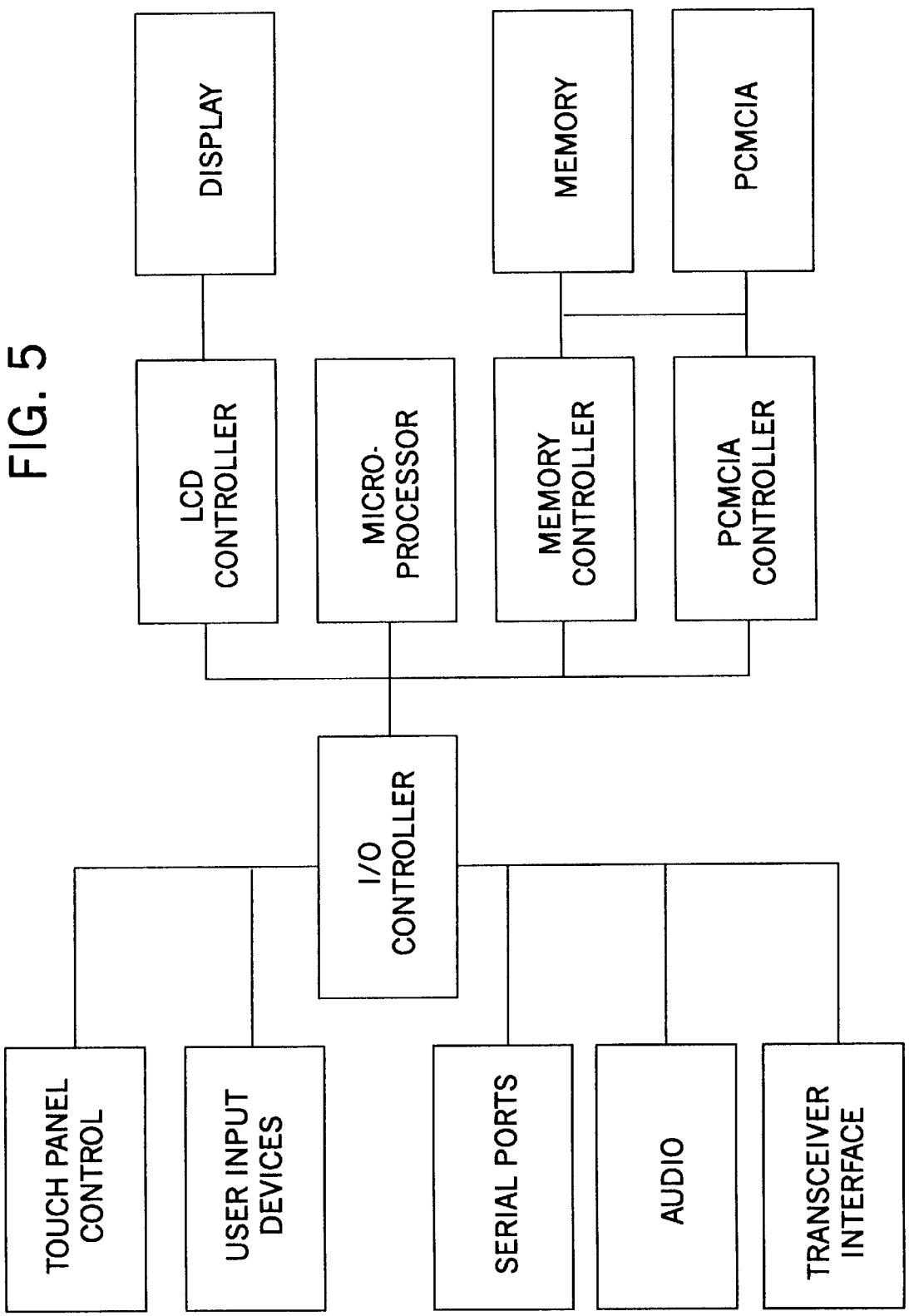
FIG. 5 is a schematic showing of certain circuitry elements embodied in the mobile client of FIGS. 2 and 3.
Figure 6:
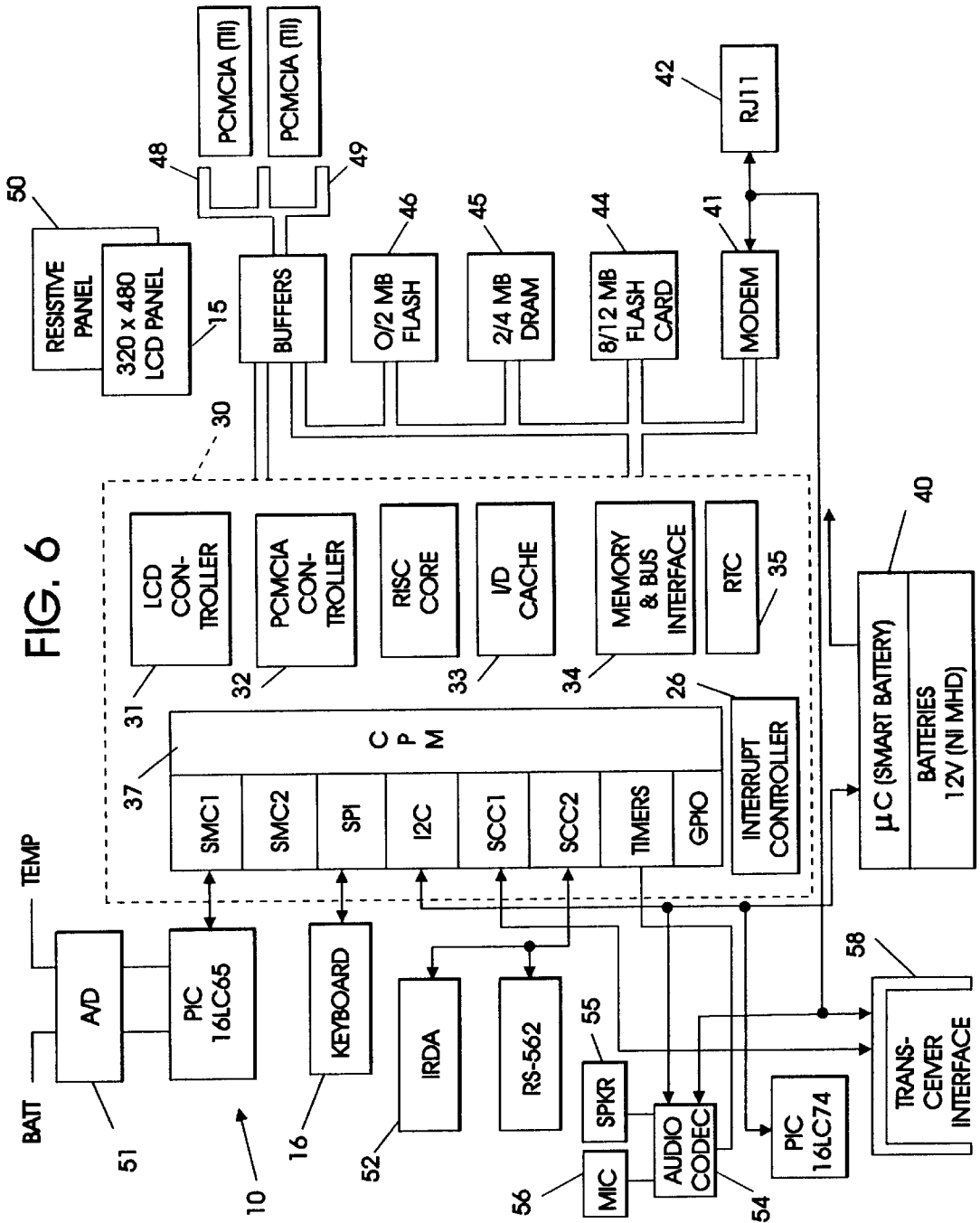
FIG. 6 is a view similar to FIG. 5 showing alternate circuitry elements.

Turning now to the circuitry elements which together accomplish the processing of data in accordance with this invention, FIGS. 5 and 6 illustrate forms of organization of such elements.

As shown in FIG. 5, which is somewhat simplified for purposes of illustration, the circuitry elements will include a central processing unit (CPU) and an associated input/output controller (IOC). The input/output controller is a programmable microcontroller which may be partitioned as a portion of the central processing unit, as is known to persons skilled in the design and fabrication of microprocessors. In the accompanying drawings, the IOC is sometimes identified as a peripheral microcontroller or by the acronym CPM. Certain of the elements provided, such as a memory controller, memory, a PCMCIA controller and associated card (if present) will be operatively coupled to the CPU and accessible to both the CPU and IOC. Others of the provided elements, such as the touchpanel control, user input devices, serial and audio ports and the transceiver interface, will be operatively coupled to the IOC and gain access to the CPU through the IOC.

As shown in FIG. 6, the illustrated mobile client system 10 has at its core a central processing unit (CPU) in the form of a microprocessor (indicated at 30) which uses reduced instruction set computing (RISC) characteristics, The CPU or processor has elements which include a controller 31 for a liquid crystal display; a controller 32 for peripherals of the type known as PCCards or PCMCIA cards; instruction/data cache 33; an interface to memory and an external bus 34; and a real time clock 35. The microprocessor also has an interrupt controller 36 and an input/output controller core 37 which defines interfaces for a variety of services. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 6 is offered as exemplary of a system in accordance with this invention, it is known that the core functionality of such a mobile client system can be otherwise configured. Similarly, while here described with reference to a handheld mobile client system, the functionality here described is attainable in other more conventional systems such as a desktop or notebook system.

As indicated in FIG. 6, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type II, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIGS. 5 and 6 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 7, to which reference is had in the following description of power management relationships. As will be understood, the management of power usage by a mobile client system is significant with regard to usability of the system.

Figure 7:
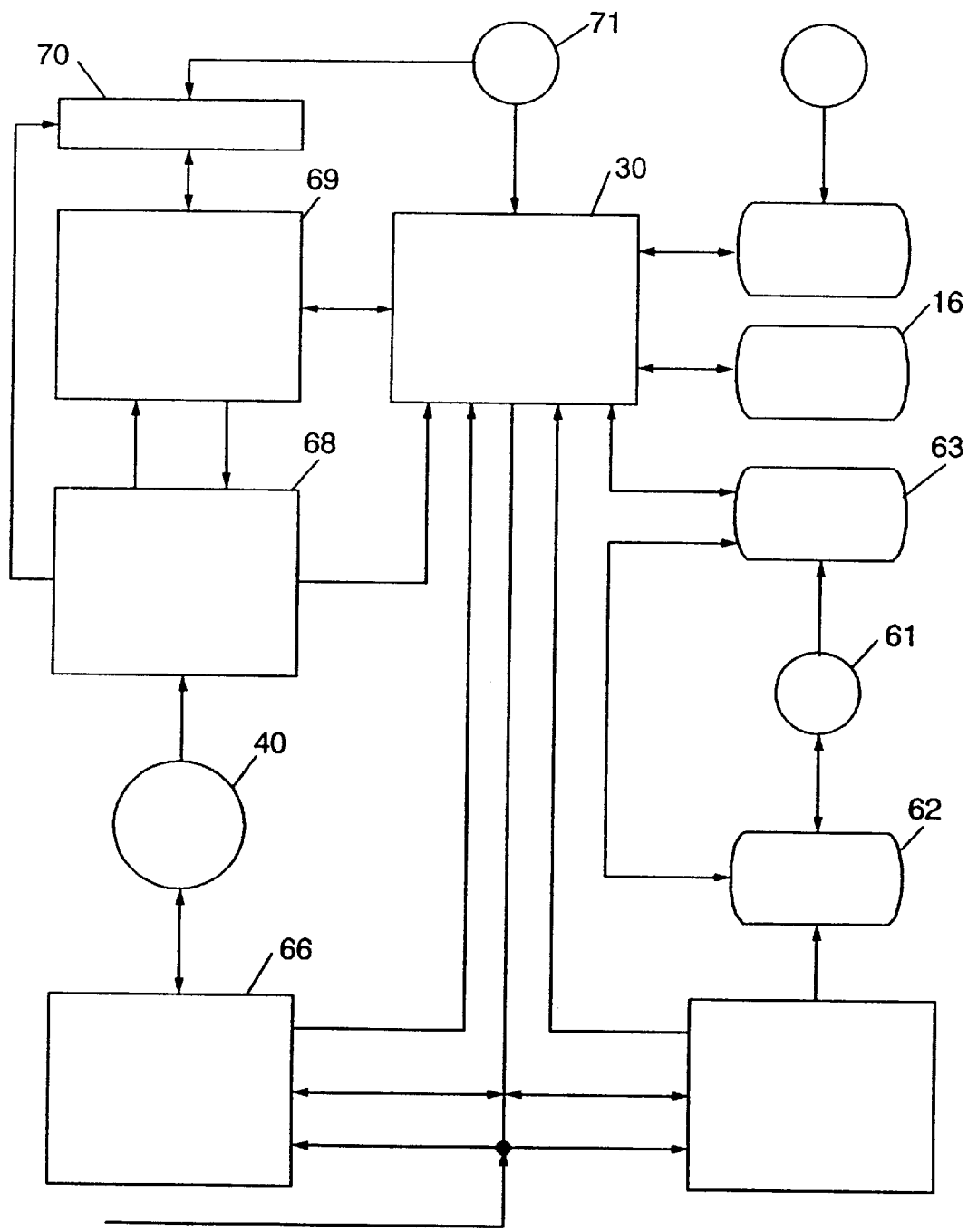
FIG. 7 is a schematic showing of certain circuitry elements and their relationships in the mobile client of FIGS. 2 and 3.

FIG. 7 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 8:
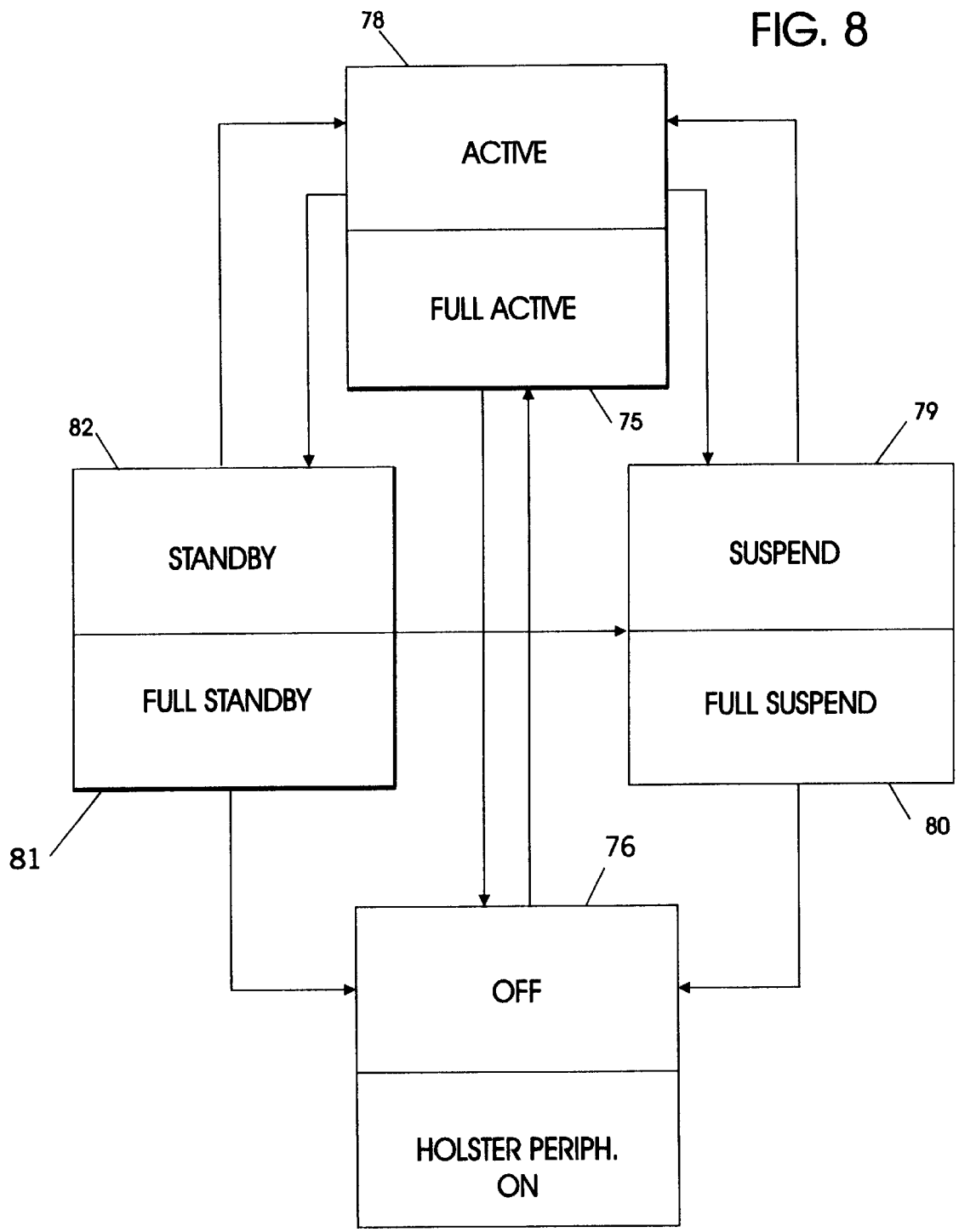
FIG. 8 is a state diagram of power modes for the mobile client of FIGS. 2 and 3 and transitions among them.

Turning now from the hardware topology to a discussion of the power modes and transition events for the mobile client system 10, FIG. 8 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 8, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark, a state indicated at 82) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the user input device or touchscreen.

Figure 9:
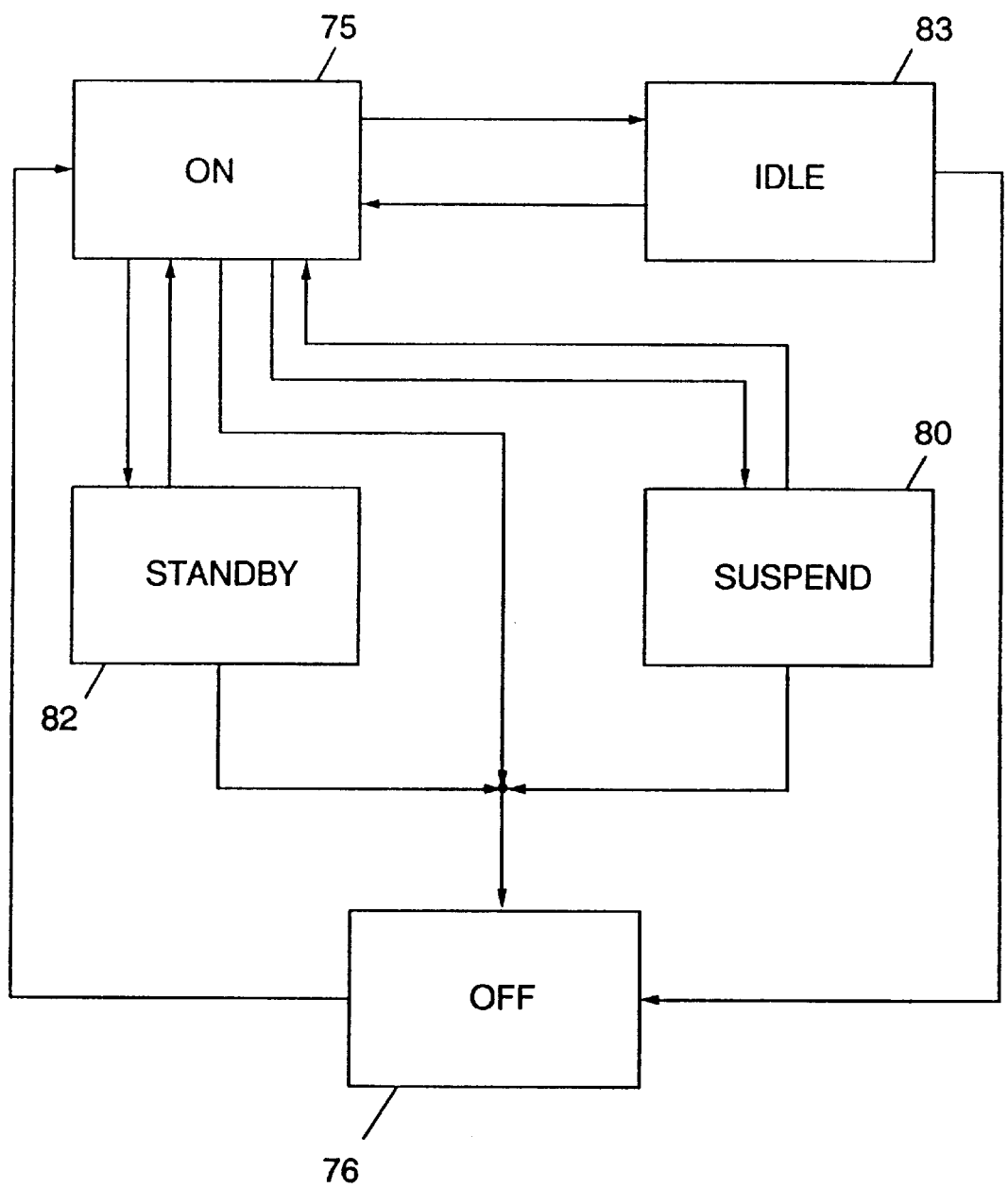
FIG. 9 is a diagram similar to that of FIG. 8 showing the states of certain elements of the mobile client of FIGS. 2 and 3 and including the status of software executing on the mobile client.

Another view of the power modes and transition events is given in FIG. 9. There, the system states are represented as being an On state 75; Idle state 83; Standby state 82; Suspend state 80; and Off state 76. In the On State 75, the system LEDs and LCD are illuminated, the processor 30 is operating in normal high function mode, the microprocessor of the user input device is operating in normal high function mode, application programs are active, and other peripherals are power managed as needed. Passage of time with inactivity will result in the system entering the Idle state 83, in which execution of application programs by the processor has ended, the processor enters a "doze high" mode of power management, the LCD is illuminated, the user input device enters its own Idle state, and other peripherals are power managed as needed. Any user event including keypresses on a keyboard will return the system to the On state. Should the passage of time cause the system to enter the Standby state 82, then application programs become static, the processor enters a "doze low" mode of power management, the LCD is dark, and all other peripherals are power managed as needed. Should the passage of time cause the system to enter the Suspend state 80, application programs become static and are checkpointed for resumption, the processor enters a "sleep" mode of power management, the LCD is darkened, and all other peripherals are off. Thus in terms of time intervals for turnaround to fully active state 75, the system will return most quickly from Idle state 83, less quickly from Standby state 82, less quickly from Suspend state 80, and most slowly from Off state 76.

It is now believed instructive to address briefly the display and communication of data as contemplated for the mobile client system of this invention. Referring now more particularly to FIG. 10, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 10. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen as well as by the optional user input device. Thus, referring to FIG. 10, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

In accordance with the present invention, a computer system such as the mobile client system or a more conventional desktop or network centric system which draws electrical power from electrical mains rather than a battery will implement a power management architecture now to be described in greater detail.

Existing architectures for power management (PM) software have hardware architectural dependencies that result in software implementations that are not easily ported across different hardware platforms. Furthermore, existing power management software architectures generally restrict all designers to only one of three types of implementation. One of these three is a device focus. In a device focussed power management technology, the power management focus is within the device drivers of a few key hardware devices, such as hard disks and modems. In this type of implementation, application and operating system software are typically not participants in the power management of the system. The control and implementation of system power management exist in several independent low-level software modules. This type of PM is device-specific.

Another type of implementation has an operating system focus. In such an implementation the operating system software monitors device driver activities in order to manage system power. In this implementation, application software and peripheral device drivers are typically not participants in managing power. The control and implementation of power management of the system exists within a single software module in the operating system, such as a power driver. This type of PM is generally hardware-platform-specific.

The third type of implementation is one with an application focus. In this type, the power management focus is within application software that monitors system activity by receiving and interpreting user inputs, and manages device power state based on those inputs. For this implementation, control and implementation of system power management exists in a single application software module. The operating system and device drivers typically lack power management awareness.

What is here disclosed is a power management software architecture that is independent of hardware architecture and that provides for flexibility in implementing the focus of power management as is beneficial for the development of power managed computer systems.

One of the biggest challenges in discussing power management is in defining and using meaningful and consistent terminology. The following terms are used throughout this document to describe various aspects of the power management system:

"Power Management (PM)" is a popular misnomer used to describe methods for optimizing the distribution of energy within a hardware system. This term is used in lieu of the more appropriate term, Energy Management. In this document, the two terms are used interchangeably. Because the physical configuration of a hardware system often impacts the power, Power Management also encompasses configuration management.

"Power Management Aware (PM-Aware)" describes a software entity that actively participates in the power management system.

A "Device" is a set of hardware components that work together to provide a function in a computer system, and that the designer chooses to treat as a single entity for the purpose of power management. A device can consume or supply energy, or can be considered as energy-neutral for the purpose of power management.

A "System" is a set of devices that comprise a computer platform.

A "Logical Device" is a software entity that the system designer chooses to represent and power-manage a hardware device.

A "Logical System" is a set of Logical Devices that fully characterizes a computer platform in power management terms.

The "Device Power Mode" is the operating state of a hardware device.

A "Device Power State" is a logical representation of a set of Device Power Modes.

"Device Energy Condition" is data that describes the present operational state of a logical device in terms of power, energy, configuration, and Device Power State.

"System Power Mode" is a set of Device Power Modes.

"System Power State" is a logical representation of a set of System Power Modes.

"System Energy Condition" is data that describes the present operational state of a logical system in terms of power, energy, configuration, and System Power State.

A "Lower Power State" is a power state in which a device or system dissipates less power than in another power state.

A "Higher Power State" is a power state in which a device or system dissipates more power than in another power state.

A "Device Power Event" is data describing a change in Device Energy Condition.

A "System Power Event" is data describing a change in System Energy Condition.

A "Policy Power Event" is data describing a change in System Energy Condition that is communicated to power aware applications.

"Static Power State" is a power state in which a device or system will remain until a Power Event occurs. A Static Power State is entered as a result of actions taken by power management software.

"Transistory Power State" is a power state in which power management software is in control of the system and may be implementing a Power State Transition. A Transistory Power State is entered as the result of a Power event, which may have a hardware cause.

"Power Management Policy" is a set of (possibly dynamic) logical rules contained in the power management system software. The purpose of the rules during computer system operation is to allocate only as much energy as is necessary to various hardware subsystems in order to accomplish tasks at an acceptable performance level. a subsystem not involved in performing user tasks is put into either a power saving state or turned off entirely, depending upon performance impacts and control overhead.

The terms "Power State" and "Power Event" are used herein and can have different meanings and representations, depending on the context in which they are used. In a hardware context, the term "Power State" describes an actual operating state of a set of hardware components in terms of configuration, power dissipation, and stored energy. a "Power Event" in this context describes a hardware signal, resulting from a hardware state change. In this context a Power State and a Power Event have an implementation dependent representation.

In a software context, "Power State" is a logical representation of the operating state of a set of hardware components and the power management system software. A "Power Event" in this context is a logical representation of a change in operating state of a power management software component. A Power State and a Power Event in this context are represented by software data.

Where the context is in the internal operation of a computer system, "Power State" and "Power Event" describe aspects of the operation of the power management system. Where the context is the externally visible operation of a computer system, "Power State" describes a system operating state that is distinguishable by a user. A "Power Event" in this context describes a change in device or system operating state caused by the user.

Figure 11:
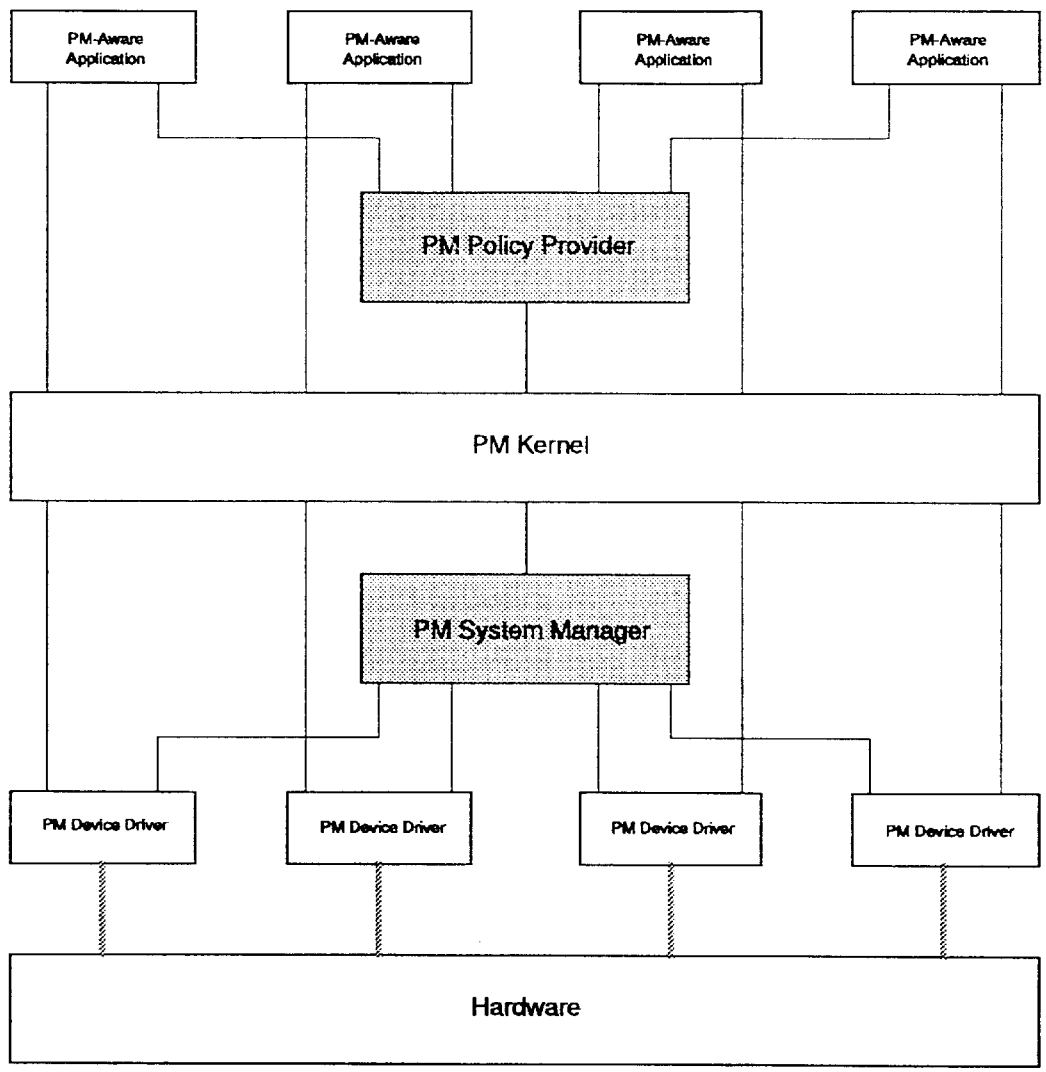
FIG. 11 is a schematic representation of the software architecture for power management of the present invention, as embodied in a system such as those of FIGS. 1 through 4.

The power management software functionality contemplated by this invention includes five functional components or areas, as illustrated in FIG. 11. These are a power management aware application program; a policy provider; a kernel; a system manager; and device driver(s). Each area or component will be discussed in turn.

A power management aware application program is a generic application that has an awareness of power management. It is commanded by and requests services from the PM Policy Provider, and also requests services of the PM Kernel. This component has dependencies on neither hardware nor power management design. The PM-Aware Application can have a PM role that ranges from incidental to critical. Functionally, a PM-aware application will register with the PM Policy Provider; react to received Policy Power Events; get operational parameters from the PM Policy Provider; get System Energy Condition data from the PM Policy Provider; issue System Power State transition commands to the PM Policy Provider; and perform 1/0 transactions with PM Device Drivers.

The power management policy provider acts as the master controller of system power management. This component has knowledge of the System Power States, the System Power Events, and the System Energy Condition, provided by the PM System Manager. It acts as a machine whose inputs are System Power Events, system queries, and system commands, and whose outputs are power state transition commands and query acknowledgments. It uses a set of (possibly dynamic) rules to transform stimuli, or System Power Events, into action, or system state transitions. In proactive implementations of power management, this component acts as a energy traffic cop. That is, when an application wants to significantly alter a device's Energy Condition, a request for approval in the form of a System Power Event is routed to the Policy Provider prior to the device changing states. The Policy Provider determines the system level impact of the requested device state change, and then approves or rejects the request based on the result of its analysis. The Policy Provider is responsible for commanding the PM-aware applications to checkpoint or shutdown when it determines that such a transition is necessary. This component can also allow the user to tune the Policy Provider operating parameters, trading run-life for performance, or vice versa. One example of such an implementation is a Policy Provider that provides the service of modifying its idleness timeout values for certain system power states or devices. The Policy Provider is abstracted from the system and device hardware by the PM Kernel, the PM System Manager, and the PM Device Drivers.

Functionally, the PM Policy Provider will: register with the PM System Manager; receive System Power Events from the PM System Manager; field System Power State transition commands from PM-Aware Applications; field System Energy Condition data requests from PM-Aware Applications; field Policy Provider Configuration requests from PM-Aware Applications; get System Energy Condition data from the PM System Manager; get System Manager Configuration data from the PM System Manager; issue System Power State transition commands to the PM System Manager; issue Policy Power Events to power-aware applications; and react to received System Power Events.

The PM kernel is preferably a portion of the operating system and acts as the power management software infrastructure, or support matrix. All of the software components within this architecture connect through this component. This component has no dependencies on either device or system power management hardware, nor does it have dependencies on the power management design. This component provides services typical of operating systems, but also provides power management services. One service of particular importance for some power management implementations is that of system idleness detection. When the kernel determines that all processes are idle, it notifies the PM System Manager. A PM Kernel that can detect idleness embodies a special logical device that generates and communicates Device Power Event.

The functionality of the PM Kernel includes: provide operating system services, such as memory and process management; detect software idleness; and issue Device Power Events to the PM System Manager.

The PM System Manager component has detailed knowledge of the devices in the system and the interrelationships of those devices. This component knows the definitions of the Device Power States for each of the logical devices in a system and defines a set of System Power States based on those Device Power States. This component obtains Device Energy Condition data and computes the System Energy Condition for use by other software components. This component is responsible for registering and abstracting new devices in systems that allow new and unknown devices to be dynamically added. This component receives and acts on power state transition commands and service requests from the PM Policy Provider. This component receives Device Power Events from logical devices and transforms those events into System Power Events, which it passes on to the Policy Provider. This component has system and device hardware dependencies, as well as dependencies on the power management design.

The functionality of the PM System Manager includes: register logical devices and abstract them for the PM Kernel, PM Policy Provider, and PM-Aware applications; define a set of System Power States in terms of Device Power States; dynamically determine the System Energy Condition; receive Device Power Events from PM Device Drivers and the PM Kernel; translate Device Power Events into System Power Events; issue System Power Events to the PM Policy Provider; field System Power State transition commands from the PM Policy Provider; provide access to the System Energy Condition data; and provide access to System Manager Configuration data.

A PM Device Driver controls a single logical device or a class of logical devices. It defines a set of Device Power States for its device(s) and provides its Device Energy Condition for access by other software entities. The Device Driver receives and acts on power-management-related commands from other software components. When some physical or software action has or will result in a significant change in the devices Energy Condition, the PM Device Driver generates a Device Power Event and communicates the Event to the PM System Manager. This component has both hardware and power management design dependencies.

The functionality of the PM Device Driver includes: manage device I/O operation; field device state-change hardware signals; define a set of Device Power States for the logical device; dynamically determine the Device Energy Condition; provide access to the Device Energy Condition data; provide access to the Device Configuration data; register with the PM System Manager; field I/O and configuration commands from the I/O software subsystem; field configuration commands from the PM system Manager; field Device Power State transition commands from the PM system Manager; generate a Device Power Event upon a significant I/O path change in Device Energy Condition; and issue Device Power Events to the PM System Manager.

Figure 12:
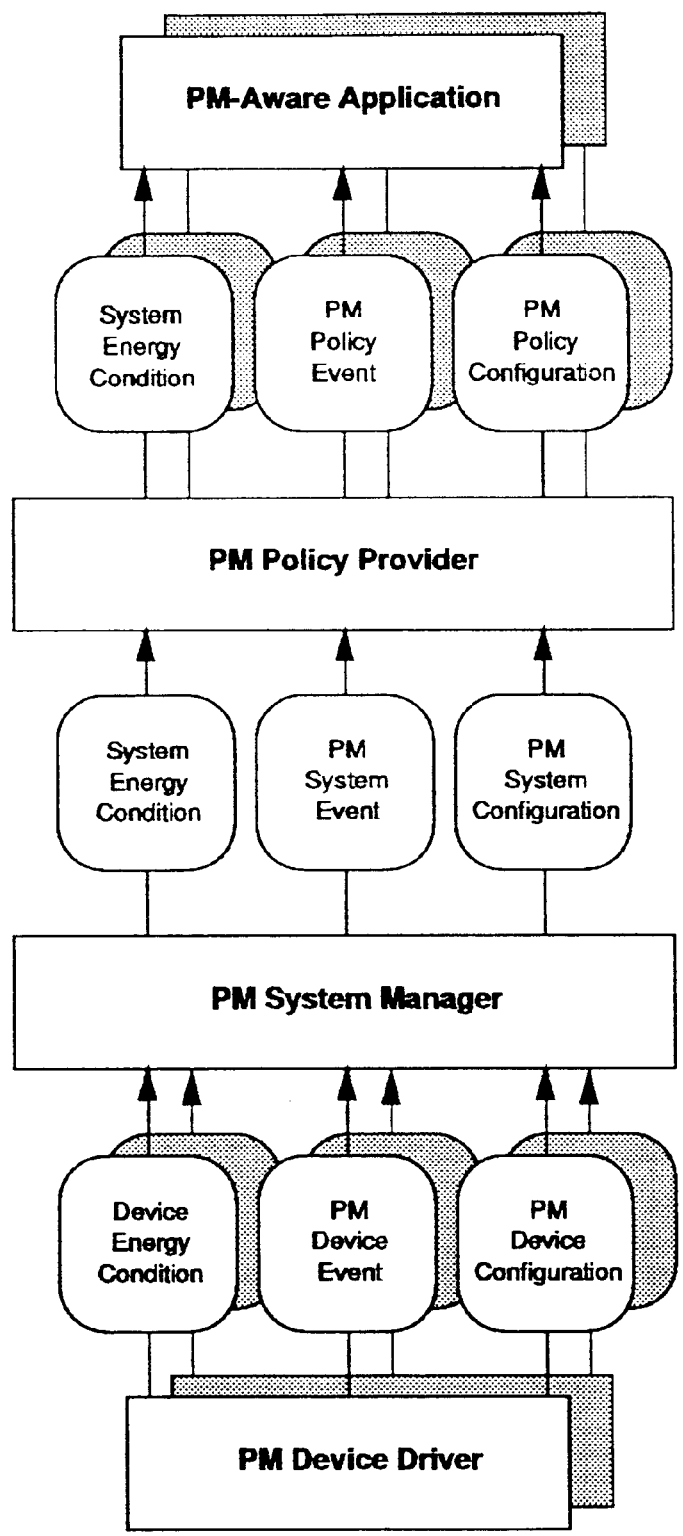
FIG. 12 is a schematic representation of data structure relationships in an operating embodiment of the power management architecture of this invention.

The present inventive power management architecture uses several sets of data to characterize the status of a computer system, as illustrated in FIG. 12. One of those is the Device Power State. There are two representations of a Device Power State, namely a definition and a summary. By definition, the Device Power State is a data structure maintained by the PM Device Driver that defines a Device Power State in terms of Device Power Modes (hardware configuration parameters). This data is static in nature, and is typically fixed at the time the PM Device Driver is developed. The PM Device Driver uses this data in order to implement Device Power State transitions. In summary, the Device Power State is an abstract representation of a Device Power Mode. This type of Device Power State is communicated to the PM System Manager and is used by it to define System Power States.

For example, the Device Power State Definition is represented by the PM Device Driver as a private data structure, a loose collection of parameters, or a combination of both. A given device may have a very large number of distinguishable Device Power Modes, since the driver manages the device with as fine a granularity of control as allowed by the hardware and the software design. The driver defines Device Power State Summaries that abstract the Device Power Modes for the purpose of providing a simplified (and manageable) mechanism for the access and manipulation of the state data. Device Power States Summaries are used to integrate the Logical Device into the management of the system. It is this form of state representation that is communicated and referenced throughout the system. The Device Power State data structure describes a static power state While the Logical Device can be considered to be operating in a transitory state when the PM Device Driver receives and acts on a Device Power Signal, the transitory power state is not represented by an architected data structure.

Other data sets used include the Device Energy Condition; Device Power Event; Device Driver Configuration; System Power State; System Energy Condition; System Power Event; System Manager Configuration; Policy Power Event; and Policy Provider Configuration.

The power management architecture is primarily event driven. That is, power management actions are performed as a reaction to a Device or System Power Event. What next follows are illustrations of scenarios which are examples of the ways in which the power management of this invention is accomplished.

Figure 13:
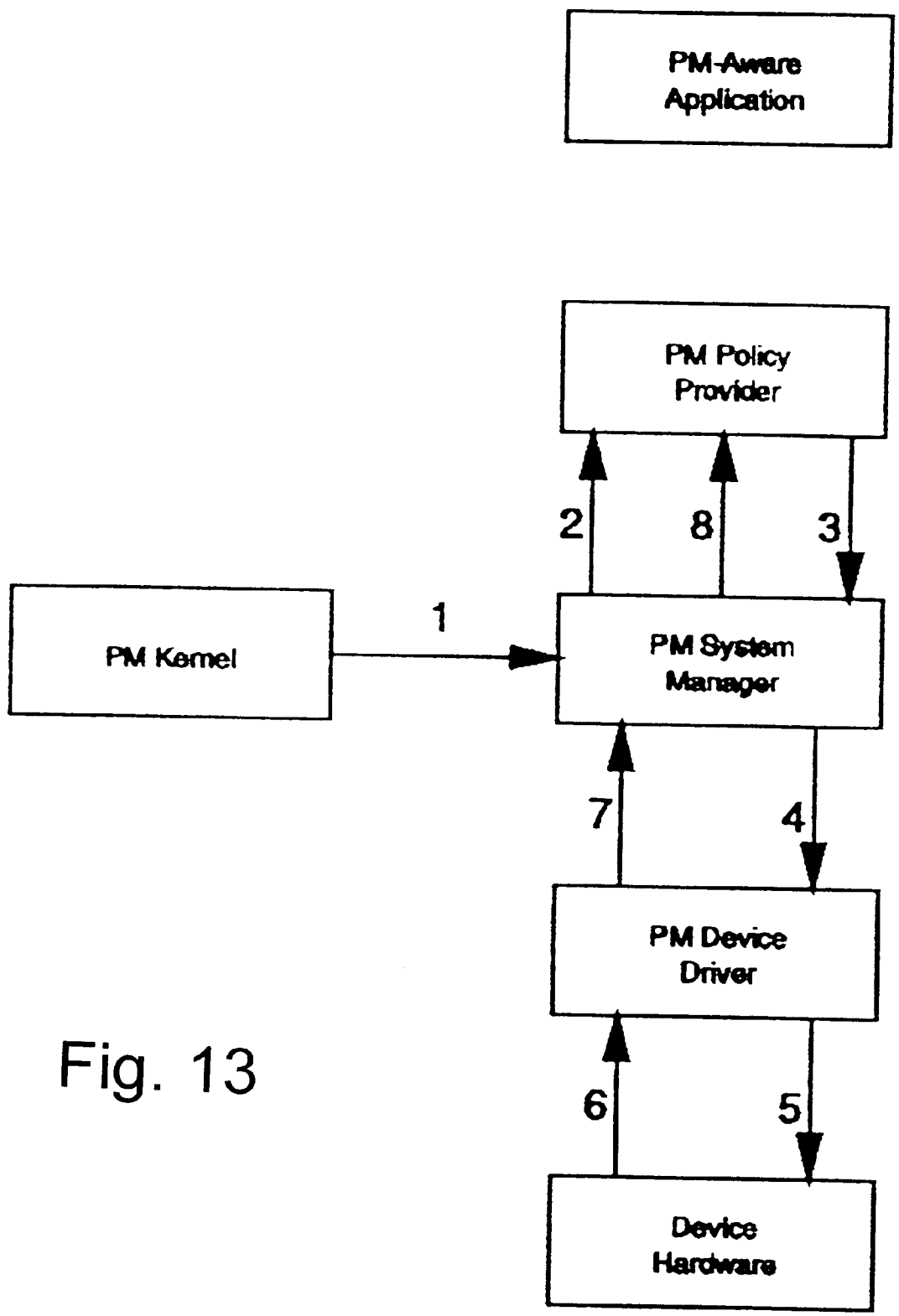
FIG. 13 is a diagrammatic representation of a sequence of interactions among the components of a power management architecture in accordance with this invention as executing one scenario of events.

The first scenario is driven by idleness of the system. In this scenario the PM Kernel provides the function of process idleness detection. The resulting System Power Event to the PM Policy Provider causes it to take the action of putting the system into a lower System Power State. FIG. 13 illustrates the software flow, which is summarized operationally, the numbered paragraphs being referenced to the numbered arrows in the Figure, as follows:

1. PM Kernel determines that the system is idle and notifies the PM System Manager. Depending on implementation, the notification process may involve the communication of a Device Power Event data structure from the PM Kernel to the PM System Manager. An alternative implementation is one in which the kernel simply signals the PM System Manager, and the manager makes an implicit assumption as to the meaning of the signal, and internally creates a Device Power Event.

2. PM System Manager translates the Device Power Event into a System Power Event. If the Device Power Event has no system-level meaning, then no System Power Event is generated, and the Device Power Event is ignored. PM System Manager communicates the System Power Event to the PM Policy Provider.

3. PM Policy Provider receives the System Power Event and inputs it to its decision engine. If necessary, PM Policy Provider queries PM System Manager for System Energy Condition and System Manager Configuration data in order to make a decision on a course of action (Arrows not shown in figure). PM Policy Provider decides that a System Power State transition is warranted. For this particular case, the PM-Aware Applications do not need to be informed. PM Policy Provider commands PM System Manager to change the System Power State.

4. PM System Manager consults its System Power State definition for the destination state. Using the obtained information, it calls the appropriate PM Device Drivers in the appropriate sequence to command them to transition to their Device Power State defined for the destination System Power State 5. PM Device Driver receives the Device Power State transition command and configures the hardware device for the new state.

6. The hardware device returns status information to the device driver.

7. PM Device Driver returns transition acknowledgment and status information to the PM System Manager. For the purposes of this example, the driver returns 'transition successful'.

Figure 14:
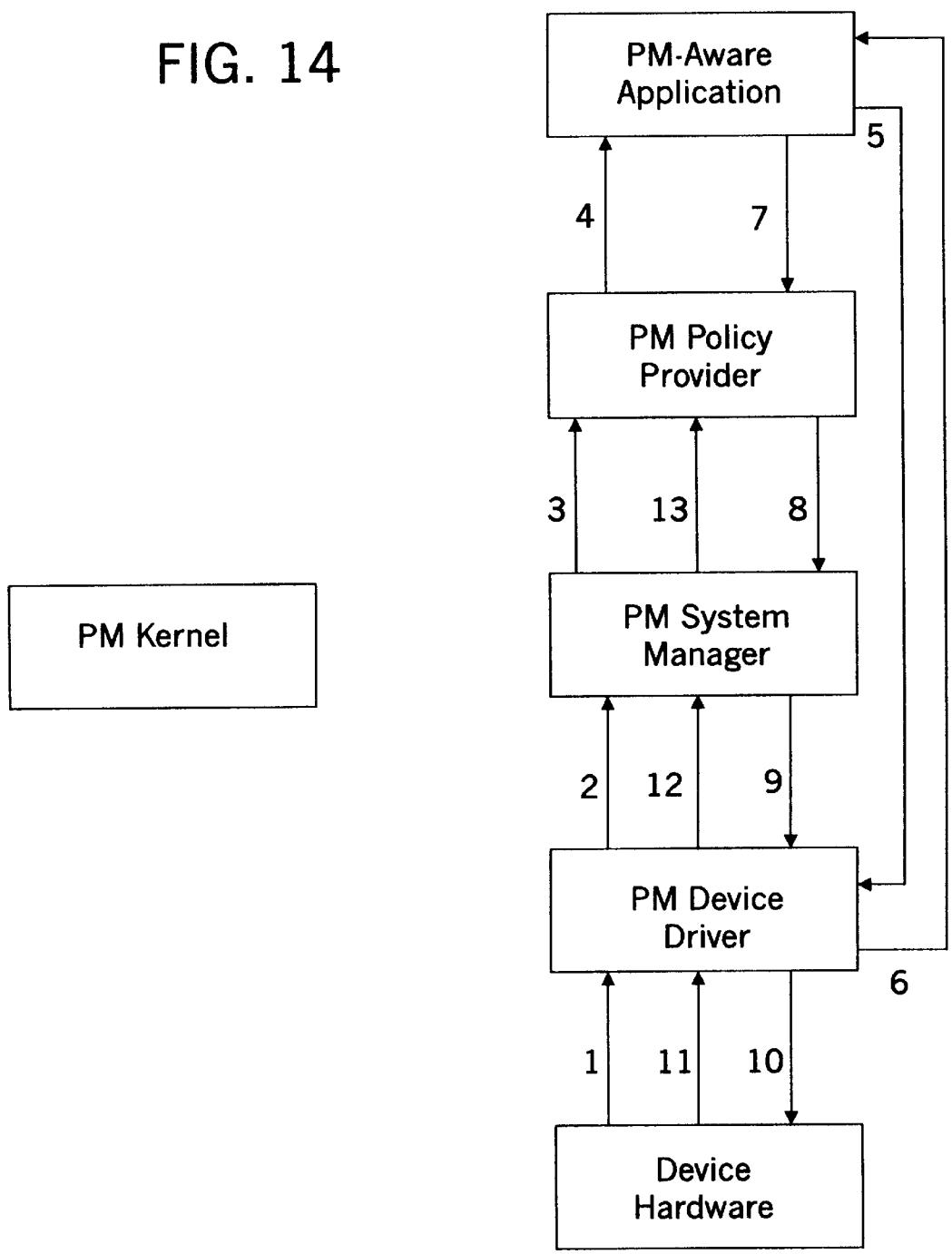
FIGS. 14 through 16 are representations similar to FIG. 13 illustrating sequences of interactions in executing other scenarios of events.

8. PM System Manager returns acknowledgment and status information to the PM Policy Provider. For the purposes of this example, the manager returns 'transition successful'. The system is now operating in the new System Power State, and the Policy Provider logical state is returned to home The next scenario describes a user placing a system into a suspended condition. In this scenario the user presses a physical Suspend Button, causing the device to generate a hardware interrupt. For this example the resulting System Power Event to the PM Policy Provider causes it to take the action of putting the system into a new System Power State (Suspend). FIG. 14 illustrates the software flow, similarly to the discussion above.

1. The user presses the Suspend Button, causing the device to generate a hardware interrupt.

2. PM Device Driver receives hardware interrupt, generates a Device Power Event (Notification), and sends it to the PM System Manager.

3. PM System Manager receives the Device Power Event, translates it into a System Power Event, and sends the System Power Event to the PM Policy Provider.

4. PM Policy Provider receives the System Power Event as an input to its decision engine. If necessary, PM Policy Provider queries PM System Manager for System Energy Condition and System Manager Configuration data in order to make a decision on a course of action (arrows not shown in figure). PM Policy Provider decides that a System Power State transition is warranted. For this particular case, the PM-Aware Applications need to be informed. PM Policy Provider generates a Policy Power Event (Command) and sends it to the PM-Aware Applications.

5. PM-Aware Application receives the Policy Power Event and determines that it needs to perform housekeeping actions, such as checkpointing to storage and terminating I/0. For this example, the application commands a PM Device Driver to perform I/O and then unlinks from the driver.

6. PM Device Driver receives I/O commands from PM-Aware Application and performs appropriate functions. The functions may involve manipulating the hardware, but for the purposes of clarity, arrows are not shown. After completing the functions, the PM Device Driver returns acknowledgment and status information to the PM-Aware application. (Note: if the command to the driver resulted in the generation of a Device Power Event, then additional software flows could be shown. For clarity, it is assumed that no Device Power Event is warranted. Had a Device Power Event been generated, and a subsequent System Power Event sent to the PM Policy Provider, then the Policy Provider would have discarded the event, and ended the flow.)

7. PM-Aware Application receives I/O command acknowledge from the PM Device Driver and returns an acknowledgment and status information to the PM Policy Provider.

8. PM Policy Provider receives acknowledgments and status from each of the PM-Aware Applications. It then proceeds to command the PM System Manager to transition System Power State (to Suspend).

9. PM System Manager consults its System Power State definition for the destination state. Using the obtained information, it calls the appropriate PM Device Drivers in the appropriate sequence to command them to transition to their Device Power State defined for the destination System Power State.

10. PM Device Driver receives the Device Power State transition command and configures the hardware device for the new state.

11. The hardware device returns status information to the device driver.

12. PM Device Driver returns transition acknowledgment and status information to the PM System Manager. For the purposes of this example, the driver returns 'transition successful'.

13. PM System Manager returns acknowledgment and status information to the PM Policy Provider. For the purposes of this example, the manager returns 'transition successful'. The system is now operating in the new System Power State, and the Policy Provider logical state is returned to home.

Figure 15:
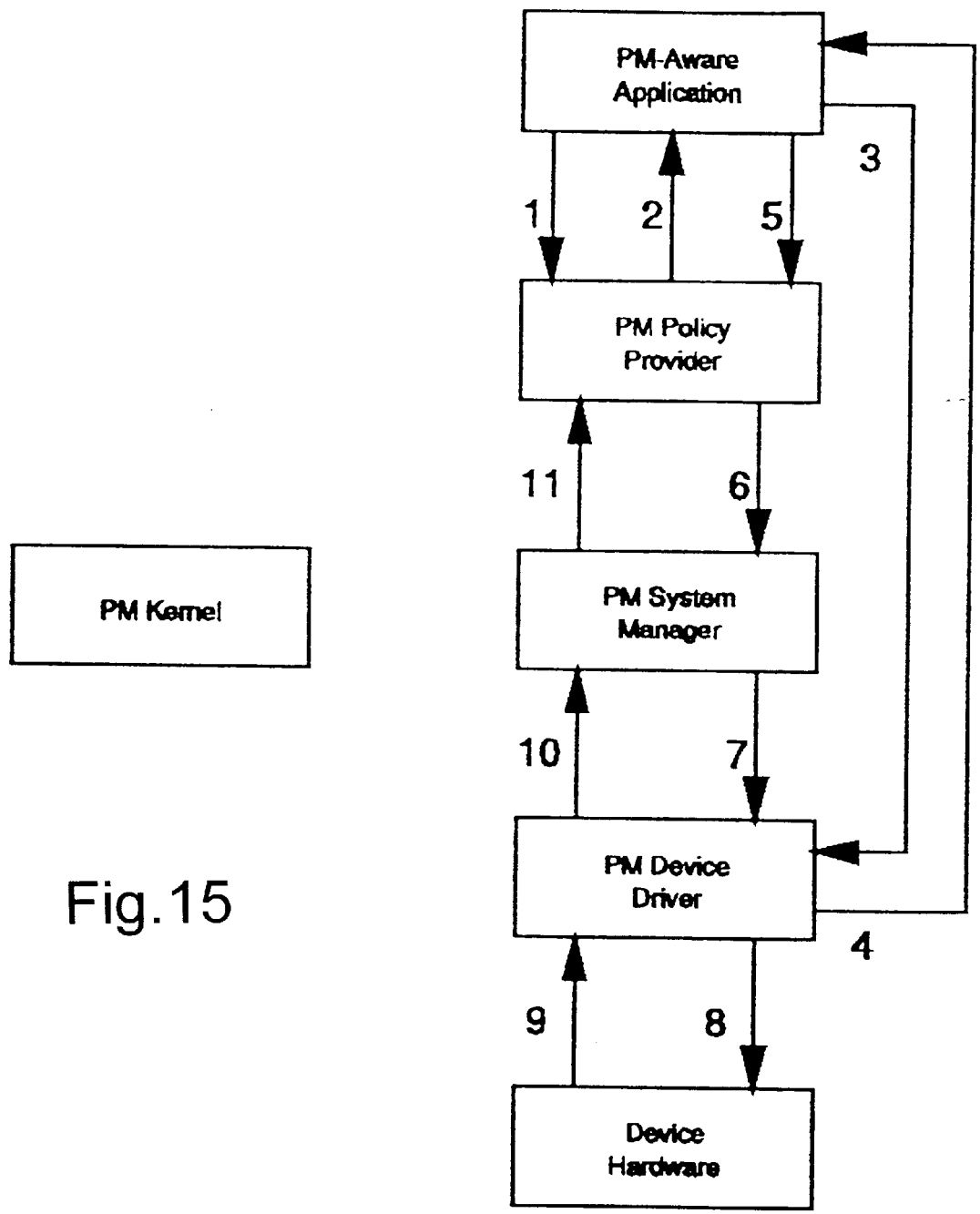

The third scenario describes a system entering a suspended state on command from an application. In this scenario the user selects 'Suspend System' within a power management application. For this example the resulting System Power Event to the PM Policy Provider causes it to take the action of putting the system into a new System Power State (Suspend). FIG. 15 illustrates the software flow, similarly to the discussion above.

1. The user selects 'Suspend System' within a power management interface of a PM-Aware application. The application converts the event into a command to the PM Policy Provider.

2. PM Policy Provider receives the command, translates it into System Power Event and uses it as a decision-engine input. If necessary, PM Policy Provider queries PM System Manager for System Energy Condition and System Manager Configuration data in order to make a decision on a course of action (Arrows not shown in figure). PM Policy Provider decides that a System Power State transition is warranted. For this particular case, the PM-Aware Applications need to be informed. PM Policy Provider generates a Policy Power Event (Command) and sends it to the PM-Aware Applications.

3. PM-Aware Application receives the Policy Power Event and determines that it needs to perform housekeeping actions, such as checkpointing to storage and terminating I/O. For this example, the application commands a PM Device Driver to perform I/O and then unlinks from the driver.

4. PM Device Driver receives I/O commands from PM-Aware Application and performs appropriate functions. The functions may involve manipulating the hardware, but for the purposes of clarity, arrows are not shown. After completing the functions, the PM Device Driver returns acknowledgment and status information to the PM-Aware application. (Note: if the command to the driver resulted in the generation of a Device Power Event, then additional software flows could be shown. For clarity, it is assumed that no Device Power Event is warranted. Had a Device Power Event been generated, and a subsequent System Power Event sent to the PM Policy Provider, then the Policy Provider would have discarded the event, and ended the flow.)

5. PM-Aware Application receives I/O command acknowledge from the PM Device Driver and returns an acknowledgment and status information to the PM Policy Provider.

6. PM Policy Provider receives acknowledgments and status from each of the PM-Aware Applications. It then proceeds to command the PM System Manager to transition System Power State (to Suspend).

7. PM System Manager consults its System Power State definition for the destination state. Using the obtained information, it calls the appropriate PM Device Drivers in the appropriate sequence to command them to transition to their Device Power State defined for the destination System Power State.

8. PM Device Driver receives the Device Power State transition command and configures the hardware device for the new state.

9. The hardware device returns status information to the device driver.

10. PM Device Driver returns transition acknowledgment and status information to the PM System Manager. For the purposes of this example, the driver returns 'transition successful'.

11. PM System Manager returns acknowledgment and status information to the PM Policy Provider. For the purposes of this example, the manager returns 'transition successful'. The system is now operating in the new System Power State, and the Policy Provider logical state is returned to home.

Figure 16:
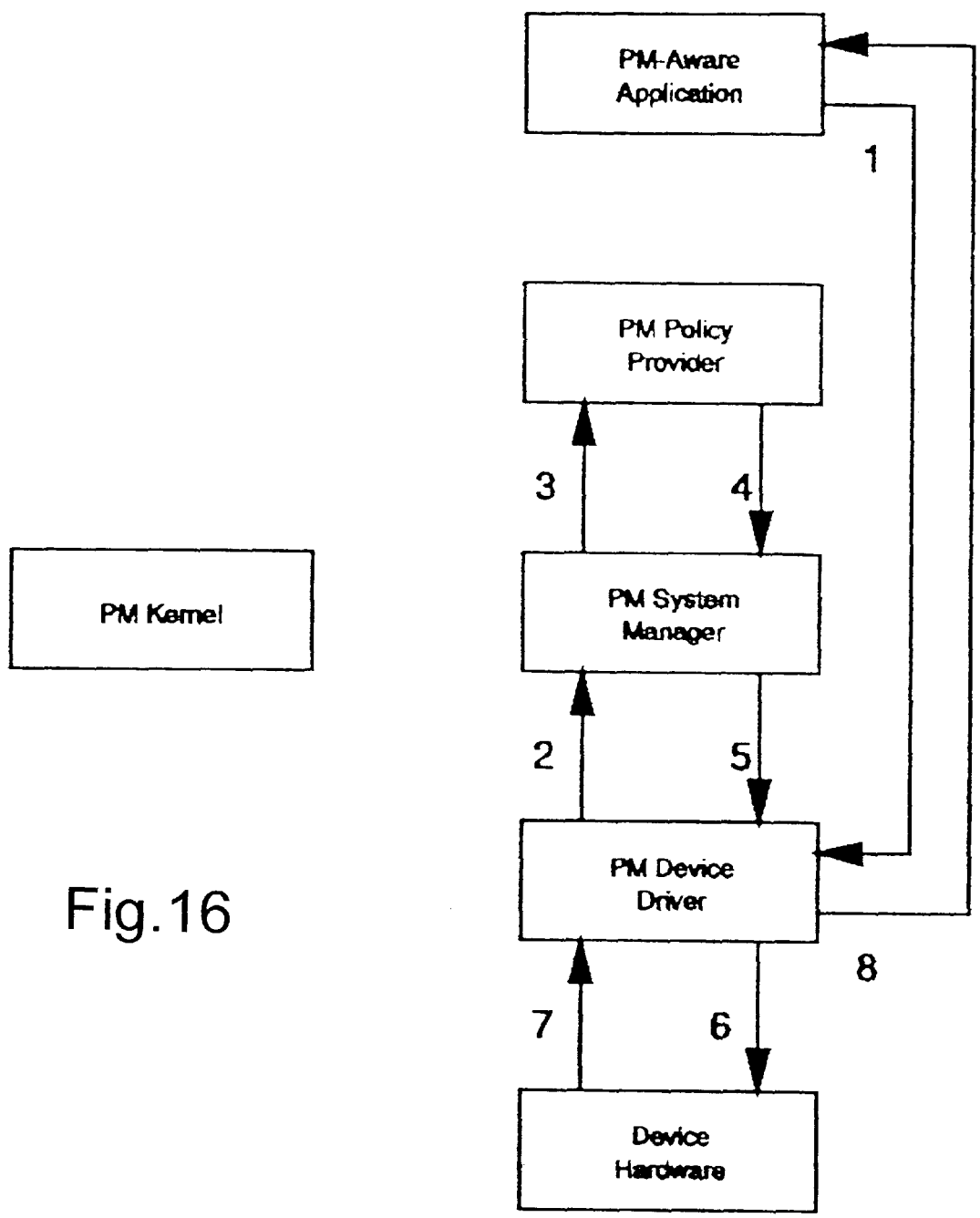

A final scenario relates to a user selecting to increase the back light intensity within a 'System Configuration' application. The configuration change request begins as an application command to the PM Device Driver. (Note: The application is not required to be PM-Aware in this scenario). FIG. 16 illustrates the software flow, similarly to the discussion above.

1. User selects to increase the intensity of the LCD Back light device by changing a setting in the System Configuration Application. The application converts the user action into a command to the LCD Back light device driver.

2. PM Device Driver receives command to increase back light intensity and determines that this request warrants the generation of a Device Power Event (Request). It generates the event and sends it to the PM System Manager.

3. PM System Manager receives the Device Power Event and determines that it has system-level implications. It generates a System Power Event (Request) and sends the event to the PM Policy Provider.

4. PM Policy Provider receives the System Power Event and applies it as an input to the decision engine. If necessary, PM Policy Provider queries PM System Manager for System Energy Condition and System Manager Configuration data in order to make a decision on a course of action (Arrows not shown in figure). PM Policy Provider decides that the System Energy Condition change request should be approved. It issues a 'request approved' message to the PM System Manager.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer system comprising:

a housing sized to be held and manipulated by the hand of a user;

a processor mounted within said housing for processing digital data;

memory mounted within said housing for storing digital data and coupled to said processor;

a display mounted in said housing and coupled to said processor and said memory for displaying information derived from digital data processed by said processor;

an input digitizer mounted in said housing and overlaying said display, said digitizer being coupled to said processor for input of digital data by a user;

a peripheral coupled to said housing and said processor;

a peripheral power supply mounted within said peripheral;

a peripheral controller mounted within said peripheral and coupled to said peripheral power supply; and an energy management control program stored in said memory and accessible by said processor for directing the energy condition of the system, said energy management control program having a system manager component and at least one other component linked thereto, said energy management control program and said processor and said peripheral controller cooperating, when said control program is executing, in (1) dynamically determining the system energy condition;

(2) identifying events affecting changes in the system energy condition; and (3) enabling energy management in accordance with any selected one of a device focus, an operating system focus, and an application focus.

2. A mobile client computer system according to claim 1 wherein said at least one other component of said energy management control program is a kernel component linking said system manager component to an operating system.

3. A mobile client computer system according to claim 1 wherein said at least one other component of said energy management control program is a policy provider component functioning as a master controller of system energy management.

4. A mobile client computer system according to claim 1 wherein said at least one other component of said energy management control program is a device driver component linking said system manager component to a hardware device.

5. A mobile client computer system according to claim 1 wherein said at least one other component of said energy management control program is an application program component exercising control of data processing by the system.

6. A computer comprising:

a housing;

a processor mounted within said housing and processing digital data;

memory mounted within said housing for storing digital data and coupled to said processor;

a display coupled to said processor and said memory to display information derived from digital data processed by said processor;

a peripheral coupled to said housing and said processor;

a peripheral power supply mounted within said peripheral;

a peripheral controller mounted within said peripheral and coupled to said peripheral power supply; and an energy management control program stored in said memory and accessible by said processor for directing the energy condition of the system, said energy management control program having a system manager component and at least one other component linked thereto, said energy management control program and said processor and said peripheral controller cooperating, when said control program is executing, in (1) dynamically determining the system energy condition;

(2) identifying events affecting changes in the system energy condition; and (3) enabling energy management in accordance with any selected one of a device focus, an operating system focus, and an application focus.

7. A computer system according to claim 6 wherein said at least one other component of said energy management control program is a kernel component linking said system manager component to an operating system.

8. A computer system according to claim 6 wherein said at least one other component of said energy management control program is a policy provider component functioning as a master controller of system energy management.

9. A computer system according to claim 6 wherein said at least one other component of said energy management control program is a device driver component linking said system manager component to a hardware device.

10. A computer system according to claim 6 wherein said at least one other component of said energy management control program is an application program component exercising control of data processing by the system.

11. A display generating system comprising:

a housing;

a processor mounted within said housing and processing digital data;

memory mounted within said housing for storing digital data and coupled to said processor;

said processor and said memory cooperating in supplying digital data driving a display of visual images;

a peripheral coupled to said housing and said processor;

a peripheral power supply mounted within said peripheral;

a peripheral controller mounted within said peripheral and coupled to said peripheral power supply; and an energy management control program stored in said memory and accessible by said processor for directing the energy condition of the system, said energy management control program having a system manager component and at least one other component linked thereto, said energy management control program and said processor and said peripheral controller cooperating, when said control program is executing, in (1) dynamically determining the system energy condition;

(2) identifying events affecting changes in the system energy condition; and (3) enabling energy management in accordance with any selected one of a device focus, an operating system focus, and an application focus.

12. A system according to claim 11 wherein said at least one other component of said energy management control program is a kernel component linking said system manager component to an operating system.

13. A system according to claim 11 wherein said at least one other component of said energy management control program is a policy provider component functioning as a master controller of system energy management.

14. A system according to claim 11 wherein said at least one other component of said energy management control program is a device driver component linking said system manager component to a hardware device.

15. A system according to claim 11 wherein said at least one other component of said energy management control program is an application program component exercising control of data processing by the system.

* * * * *